United States Patent [19]

Röhm

[11] 4,214,765
[45] Jul. 29, 1980

[54] LOCKABLE DRILL CHUCK

[76] Inventor: Günter H. Röhm, Heinrich-Röhm-Strasse 50, 7927 Sontheim, Fed. Rep. of Germany

[21] Appl. No.: 40,125

[22] Filed: May 18, 1979

[30] Foreign Application Priority Data

Dec. 8, 1978 [DE] Fed. Rep. of Germany ....... 2853045

[51] Int. Cl.² .............................................. B23B 31/12
[52] U.S. Cl. ..................................... 279/1 K; 279/60; 279/62
[58] Field of Search ............... 279/1 K, 1 ME, 60, 61, 279/62, 1 SG, 6, 63, 64, 65

[56] References Cited

U.S. PATENT DOCUMENTS

3,938,817   2/1976   Rohm ..................................... 279/61

FOREIGN PATENT DOCUMENTS

496775   2/1929   Austria ....................................... 279/60
2347364   4/1975   Fed. Rep. of Germany ............. 279/64
2639214   3/1978   Fed. Rep. of Germany ............. 279/60

*Primary Examiner*—William R. Briggs
*Attorney, Agent, or Firm*—Karl F. Ross

[57] ABSTRACT

A drill chuck has a chuck body defining a chuck axis and provided with a plurality of generally angularly equispaced and radially displaceable tool-engaging jaws. A tightening ring and sleeve rotatable on the chuck body about the chuck axis have formations that radially displace the jaws to grip a tool. An eccentric is rotatable on the chuck body about an eccentric axis radial of the chuck axis. This eccentric has an eccentric surface spaced from the ring and engageable via a locking member axially on the tightening ring to lock this ring in the chuck body. This eccentric is rotated about the eccentric axis by insertion of a non-cylindrical tip of the standard chuck-tightening key into a correspondingly shaped recess of the eccentric.

10 Claims, 2 Drawing Figures

LOCKABLE DRILL CHUCK

CROSS-REFERENCE TO RELATED APPLICATIONS

This application is related to subject matter of my copending applications Ser. Nos. 011,772, 011,773, and 011,774, all filed Feb. 13, 1979.

FIELD OF THE INVENTION

The present invention relates to a chuck. More particularly this invention concerns a drill chuck which can be locked to prevent its loosening once it is tightened on a tool.

BACKGROUND OF THE INVENTION

A conventional drill chuck has a chuck body which defines and is rotatable about a chuck axis, and which carries a plurality of generally angularly equispaced and radially displaceable jaws. A tightening ring, normally linked to a tightening sleeve, is rotatable on the chuck body about the axis. Formations between the jaws, the tightening ring, and the body serve to radially displace the jaws on the body on rotation of the ring on the body about the chuck axis. These formations normally include interengaging screw threads between the jaws and the tightening ring and inclined guides in the body supporting the jaws so that same move axially as well as radially when tightened or loosened. It is also standard practice to tighten such a chuck by means of a key. To this end the ring is formed with an array of axially directed teeth centered on the chuck axis. The chuck body is formed with at least one radially outwardly open hole adjacent this array of teeth. A key is formed with a cylindrical projection engageable in this hole, and with a gear that meshes with the teeth when the projection is engaged in the recess. Thus rotation of the key while its projection is engaged in the chuck-body recess will rotate the tightening ring on the chuck body and thereby tighten or loosen the jaws. Obviously a transverse handle on this key allows considerable torque to be brought to bear, so that the chuck can be drawn very tight, or loosened once it is very tight.

The principal disadvantage of this prior-art arrangement is that at least some of the forces inherently effective on the jaws during drilling, and in particular during hammer drilling when the chuck is reciprocated axially as well as being rotated about its axis, have a component which is effective on the tightening ring in the direction tending to loosen the chuck. Thus under some circumstances the drill chuck will loosen.

Accordingly it is known, as for example from the above-cited copending applications as well as from, for instance, German published patent specification No. 2,639,214, to provide a system for positively locking the tightening ring in the chuck body. Such a system normally comprises a multiplicity of angularly equispaced teeth or stops formed on the tightening ring and engageable by one or more members affixed on the chuck body.

Such an arrangement has two principal disadvantages. First of all no matter how many such stops or teeth are provided, the tightening ring can only be locked in a finite number of angularly offset positions relative to the chuck body. For this reason some loosening is normally possible unless it so happens that the chuck is tightened to a position exactly corresponding to engagement of the locking element with one of the stops or teeth. Furthermore when such an arrangement is used in a hammer drill it is possible that the violent forces to which the various components of the chuck are subjected will allow the locking member to move momentarily out of contact with its stop, so that the tightening ring can loosen in spite of the provision of the special locking arrangement.

OBJECTS OF THE INVENTION

It is therefore an object of the present invention to provide an improved drill chuck.

Another object is to provide a lockable drill chuck which overcomes the above-given disadvantages.

SUMMARY OF THE INVENTION

These objects are attained according to the instant invention in a drill chuck of the above-described general type provided with an eccentric rotatable in the body about an eccentric axis lying in a plane transverse to the chuck axis and having an eccentric surface spaced from the ring. A locking member is axially displaceable in the body and axially simultaneously engageable in one direction with the tightening ring and in the opposite direction with the eccentric surface. Means is provided for rotating this eccentric about its axis between a locking position pressing the locking member axially tightly against the ring to prevent its rotation, and a freeing position allowing the ring to rotate on the body.

According to this invention the surface of the ring against which the locking member engages is smooth and uninterrupted so that the tightening ring can be locked in any angular position relative to the chuck body. For this reason the chuck will not be able to loosen at all once locked. Furthermore since the various parts—the eccentric, locking member, and ring—are all stressed against each other the system is not likely to loosen even when subjected to extremely violent outside forces. Only a rotary force on the eccentric would suffice to loosen the arrangement of the invention, and such a force would not be encountered under any foreseeable drilling conditions.

According to further features of this invention the eccentric itself is a substantially cylindrical plug received in a correspondingly cylindrical and radially extending recess of the chuck body. This plug has a circumferential and radially outwardly open groove having a cylindrical floor centered on an offset axis and constituting the eccentric surface. The locking member itself is a short cylindrical bolt extending parallel to the chuck axis and having one end confronting and engageable flatly against the tightening ring and another end confronting and engageable against the eccentric surface of the eccentric in a direction radial of the eccentric rotation axis.

The means for rotating the eccentric according to this invention can be formed right on the key normally provided for tightening and loosening the chuck in the manner described above. To this end the eccentric plug is formed with a non-cylindrical radially outwardly open recess centered on its eccentric rotation axis. The tip of the key is formed of a complementary section to this noncylindrical recess so that when it is inserted therein the key itself can be used to rotate the eccentric. Thus once the key has been employed to tighten the chuck, the user withdraws it from the hole in which it was inserted to tighten the chuck and inserts it in the hole of the eccentric to lock the chuck in the tightened condition.

The socket recess in the eccentric is spaced axially from the array of teeth on the tightening ring so when the key is engaged it does not mesh with the tightening-ring teeth. The bore in which the tip or projection of the key is received to tighten the chuck is made cylindrical, whereas the recess of the eccentric is formed with at least one flat. The projection of the chuck key is also formed with at least one flat so that, whereas it can rotate freely in the bore formed in the chuck body, when inserted into the recess of the eccentric it will be rotationally coupled thereto.

SPECIFIC DESCRIPTION

Figure 1:
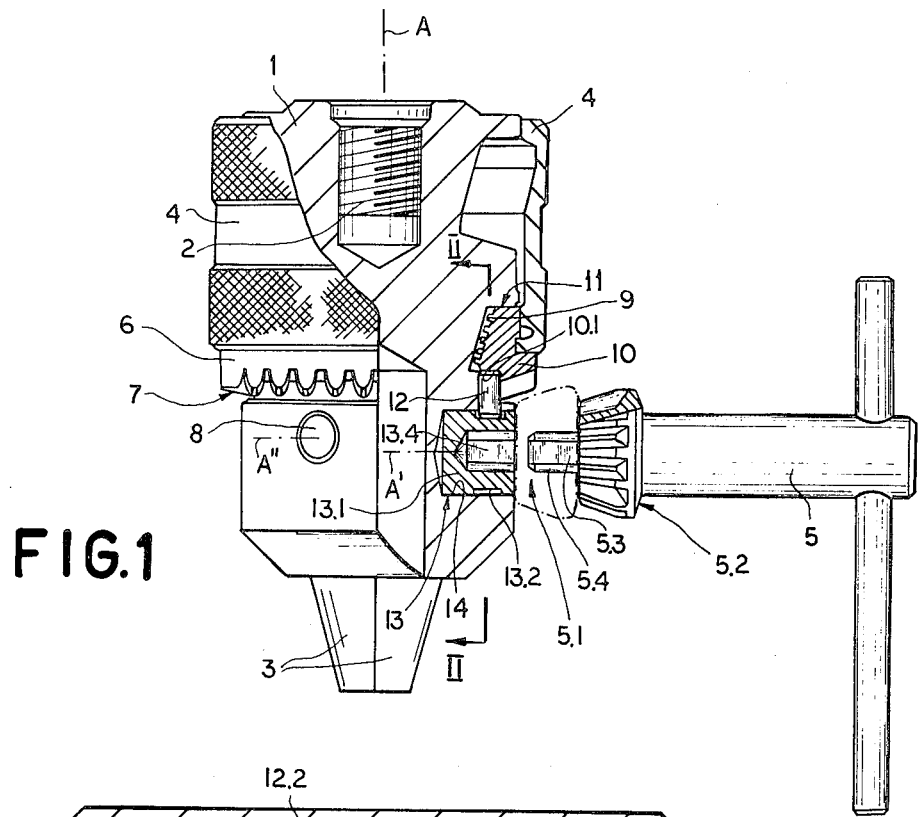
FIG. 1 is a side and partially sectional view of a drill chuck according to this invention.

As shown in FIG. 1 a drill chuck according to this invention has a chuck body 1 centered on an axis A and formed with an axially open threaded bore 2 normally screwed over the stem or spindle of a tool such as a hammer drill. This body 1 is formed with guides inclined relative to the axis A and each receiving a respective one of three jaws 3. A tightening sleeve 4 is rotatable by means of a tightening key 5 engageable with a rack 6 of teeth 7 on a tightening ring 10. The body 1 is formed with a radially outwardly open groove 11 in which the ring 10 is rotatable about the axis A. Rotation of the sleeve 4 manually or by means of the key 5 will radially and axially displace the jaws 3 in the manner described in my above-cited copending application as well as in the art cited therein.

Figure 2:
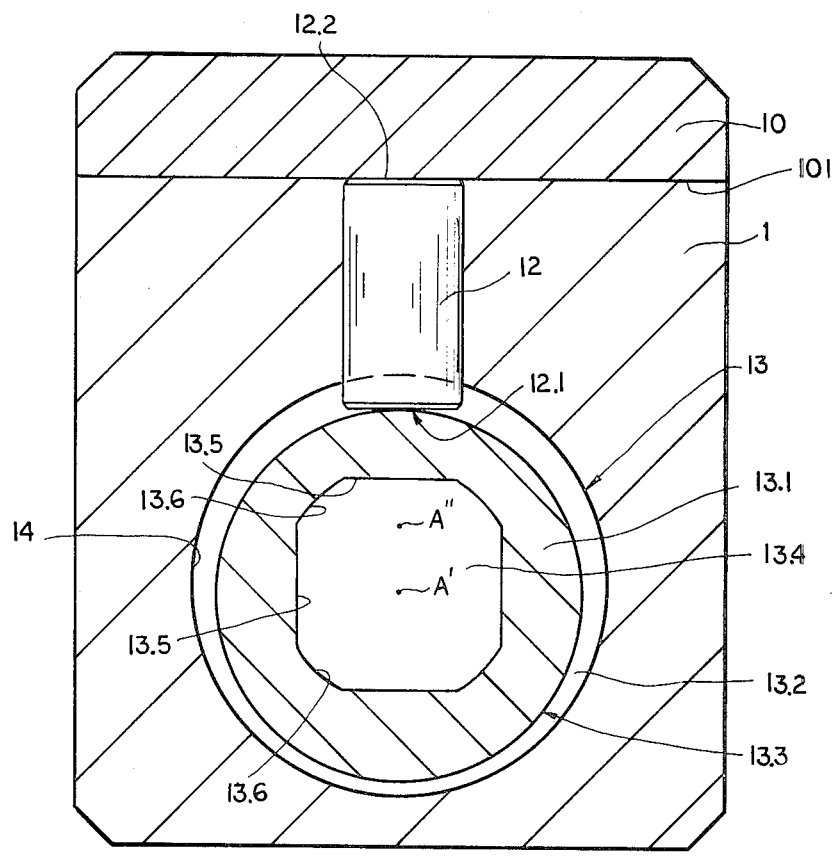
FIG. 2 is a large-scale section taken along line II—II of FIG. 1.

In order to lock the ring 10 against rotation, and thereby prevent the chuck from loosening from a tool seized between its jaws 3, an eccentric 13 is provided which is effective through a locking member 12. To this end the ring 10 has a smooth and featureless surface 10.1 lying in a plane perfectly perpendicular to the axis A and engageable with the upper end surface 12.2 of the cylindrical plug 12. The eccentric 13 is formed as a cylindrical plug 13.1 received in a cylindrical blind bore 14 formed in the chuck body 1 and centered on an axis A' radial of the axis A. This plug 13.1 is formed with a radially outwardly open groove 13.2 having a floor 13.3 engageable with the flat lower end 12.1 of the locking element 12. The floor surface 13.2 lies on a cylinder having a central axis A" offset from but parallel to the axis A'. Thus as is clear from FIG. 2 rotation of the plug 13.1 about the axis A' will vary the axial distance between the closest portion of the surface 13.2 and the surface 10.1.

To rotate the eccentric 13 the key 5 has a tip or projection 5.1 extending outwardly from its conventional gear 5.2 which is meshable with the teeth 7. The plug 13.1 is correspondingly formed with a recess 13.4 centered on the axis A'. The tip 5.1 is formed with four angularly equispaced flats 5.3 separated by part-cylindrical regions 5.4. Similarly the recess 13.4 is formed with four angularly equispaced flats 13.5 separated by part-cylindrical rounded regions 13.6.

When the tip 5.1 is inserted in the hole 8, which lies on a center closer to the tightening ring 10 than the axis A', it will engage via its part-cylindrical region 5.4 with the inner surface of this bore 8 so as to be firmly guided while the gear 5.2 meshes with the teeth 7 of the rack 6. When the tip 5.1 is engaged in the recess 13.4, however, its flats 5.3 would have to lie flatly against the flats 13.5 so that the eccentric 13 and the key 5 would be rotationally linked about the axis A'. Similarly since the axis A' is further from the tightening ring 10 and the axis A" of the bore 8, the gears 5.2 will not be in mesh with the teeth 7 as indicated by dot-dash lines in FIG. 1.

The chuck according to this invention is normally tightened on the tool first by rotation of the sleeve 4 by hand until the jaws engage the tool. Then the tip 5.1 of the key 5 is inserted in the hole 8 and the key 5 is rotated to make the jaws 3 very tight on the tool. Thereafter the user withdraws the tip 5.1 of the key from the hole 8 and inserts it into the complementary recess 13.4 and rotates the eccentric 13 until it is tight, which will occur when the surfaces 12.1 and 12.2 of the pin 12 bear tightly against the respective surfaces 13.3 and 10.1. To loosen the chuck the reverse procedure is followed.

I claim:

1. A drill chuck comprising:
   a chuck body defining a chuck axis;
   a plurality of generally angularly equispaced and radially displaceable jaws on said body;
   a tightening ring rotatable on said chuck body about said axis;
   means including formations between said jaws, ring, and body for radially displacing said jaws on rotation of said ring on said body about said axis;
   an eccentric rotatable in said body about an eccentric axis lying in a plane transverse to said chuck axis and having an eccentric surface spaced from said ring;
   a locking member axially displaceable in said body and axially simultaneously engageable in one direction with said ring and in the opposite direction with said eccentric surface; and
   means for rotating said eccentric about said eccentric axis between a locking position pressing said member axially against said ring and preventing rotation thereof and a freeing position allowing said ring to rotate on said body.

2. The drill chuck defined in claim 1 wherein said eccentric axis is substantially radial of said chuck axis.

3. The drill chuck defined in claim 2 wherein said eccentric has a cylindrical surface centered on said eccentric axis, said body being formed with a cylindrical recess rotatably receiving said body and engaging said cylindrical surface.

4. The drill chuck defined in claim 3 wherein said locking member is a bolt axially displaceable, radially fixed, and angularly fixed in said chuck body.

5. The drill chuck defined in claim 4 wherein said eccentric is formed with a circumferential groove having a floor constituting said eccentric surface, said bolt engaging said floor.

6. The drill chuck defined in claim 3 wherein said eccentric is formed with a noncylindrical recess open axially of said eccentric axis and radially outwardly of said chuck axis, said means including a key having a projection snugly fittable in said recess, whereby rotation of said key rotates said eccentric about said eccentric axis.

7. The drill chuck defined in claim 6 wherein said ring is formed with an array of axially directed teeth centered on said chuck axis, said key being formed with gear meshable with said teeth, said body being formed with at least one radially outwardly open bore adjacent said array of teeth, said key being rotatable with said projection engaged in said bore and with said gear meshing with said teeth to rotate said ring relative to said body, said gear being out of mesh with said teeth when said projection is engaged in said recess.

8. The drill chuck defined in claim 7 wherein said recess is further from said ring than said bore in the direction of said chuck axis.

9. The drill chuck defined in claim 8 wherein said recess is further from said ring than said bore in the direction of said chuck axis.

10. The drill chuck defined in claim 3, further comprising a tightening sleeve fixed to said ring and surrounding said body.

* * * * *